Nov. 22, 1966     S. E. STOLL     3,286,826

DOG REFUSE PACKAGE

Filed June 24, 1964

INVENTOR.
SIGRID E. STOLL
BY
William C. Babcock
ATTORNEY

United States Patent Office 3,286,826
Patented Nov. 22, 1966

3,286,826
DOG REFUSE PACKAGE
Sigrid E. Stoll, 1800 N. Serrano St.,
Hollywood, Calif. 90027
Filed June 24, 1964, Ser. No. 377,589
1 Claim. (Cl. 206—47)

The present invention relates generally to the field of accessories that are adapted for use in the maintenance of animals, especially dogs, and more particularly to a package combination by means of which dog refuse may be conveniently scooped up from the ground and deposited therein, with the package thereafter being closed and disposed of.

One particular annoyance in keeping dogs as pets in the city is the tendency of such animals to deposit refuse on neighboring lawns during the time the animals are being walked. Heretofore, little or nothing could be done when such an occurrence takes place.

A major object of the present invention is to provide a compact portable package combination including a deformable scoop for removing dog refuse from a lawn or public place and depositing the same in a sack that forms a part of the combination, with the sack being sealable to contain the refuse and used scoop until such time as the entire assembly can be suitably disposed of.

Another object of the invention is to supply a combination package that can be formed from inexpensive paper and cardboard, is simple and easy to use, and can be fabricated from standard commercially available materials where it can be retailed at a sufficiently low price as to encourage its widespread use.

Still another object of the invention is to provide a combination package for dog refuse that is sanitary and does not attract flies or other insects after use.

These and other objects and advantages of the invention will become apparent from the following description of a preferred form thereof, and from the accompanying drawing illustrating the same, in which.

Figure 1:
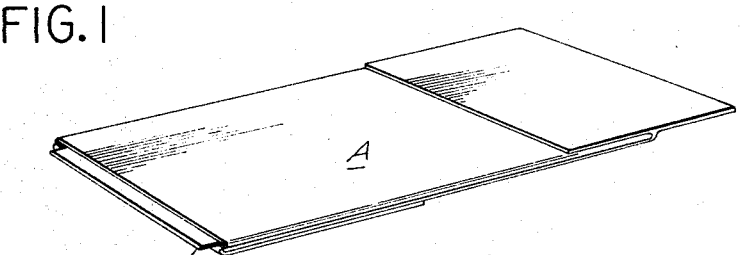
FIGURE 1 is a perspective view of the combination package in a carrying position.

With continuing reference to the drawing for the general arrangement of the invention, it will be seen to include a foldable paper refuse container A and a rollable scoop B for placing animal refuse C in the container.

The container A is preferably formed from kraft paper, and may be fabricated similarly to a conventional sack such as used in markets and other stores, or the like. Container A is formed with two side walls 10 that merge along their longitudinal edges into two end walls 12. The side walls 10 and end walls 12 develop into a bottom 14, as may best be seen in FIGURE 2. A centrally disposed, longitudinally extending fold line 12a is formed in each end wall 12, and the bottom 14 has a transverse fold line 14a formed therein. The fold lines 12a and 14a permit the container A to assume the flat configuration shown in FIGURE 1.

One of theside walls 10, as may best be seen in FIGURE 1, has an extension 10b projecting outwardly therefrom, which is also formed from kraft paper. The extension 10b is preferably formed as an integral part of the side wall 10 from which it projects. However, if desired, extension 10b can be adhered to the free end portion of one of the side walls 10 by conventional means. The purpose of extension 10b will be described hereinafter.

Figure 3:
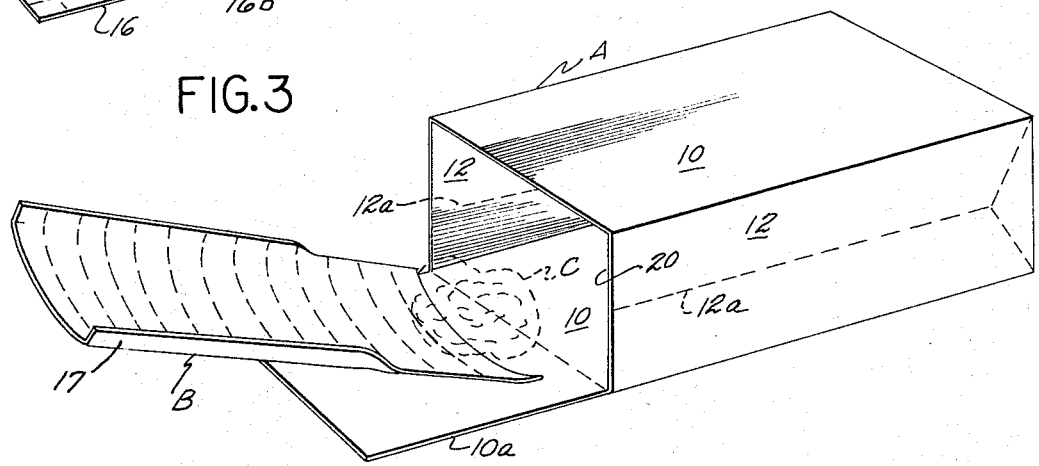
FIGURE 3 is a perspective view of the package in an expanded position after animal refuse has been placed therein.

Scoop B is formed from a rectangular sheet 16 of cardboard of sufficient stiffness as to support animal refuse C in the manner shown in FIGURE 3, when the scoop is transversely curved into a concave-convex configuration shown. A number of transverse, longitudinally spaced fold lines 16a are formed in sheet 16. Two longitudinally extending fold lines 16b are formed in sheet 16 and are located inwardly a short distance from the edges thereof. Prior to use, the scoop B is normally disposed within the container A and the extension 10b folded back on the exterior surface of the side wall 10 of which it forms a part.

Figure 2:
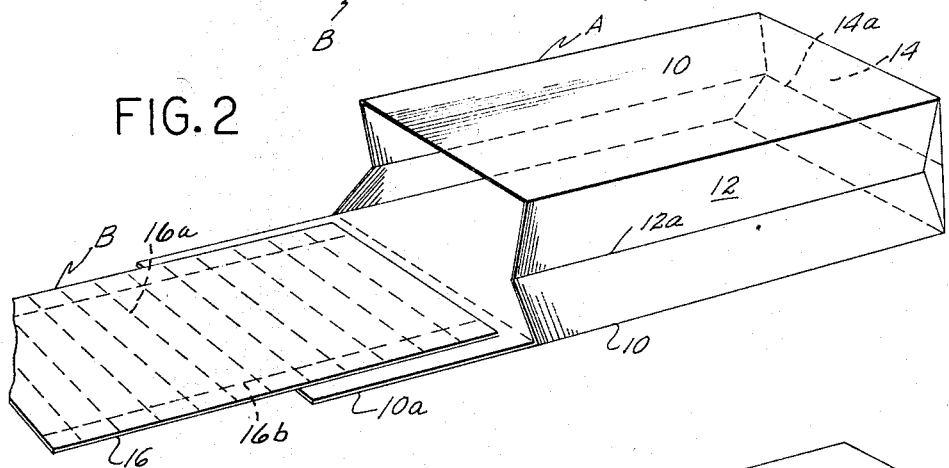
FIGURE 2 is a perspective view of the package in an expanded position prior to use.

When it is desired to use the combination package, the container A is expanded to the position shown in FIGURE 2 and placed on the ground adjacent the refuse C. The extension 10b is in contact with the ground surface to avoid obstructing the opening 20 in container A.

Either before or after the container A is placed in the expanded position, the scoop B is removed therefrom. The scoop is then creased lengthwise along the fold lines 16b to form two laterally spaced, parallel, upwardly extending flanges 17. When one end portion of the scoop B is grasped between the thumb, forefinger and third finger (not shown), and pressure applied to the scoop, the cardboard sheet 10 can be formed into the shape shown in FIGURE 3, with the end portion most remote from the hand being flattened by contact with the ground to slide under the dog refuse. The portions of the flanges 17 above the flattened portion act as stiffeners, to assure that the part of the Scoop B serving as a handle will no bend under the weight of the refuse on the flattened portion of the sheet. Thereafter, the scoop B may be used to pick up the refuse C and place it inside the container A, as shown in FIGURE 3.

Figure 4:
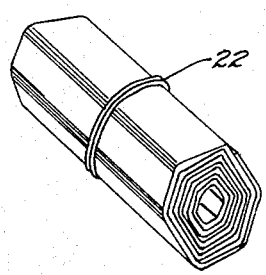
FIGURE 4 is a perspective view of the package in a sealed position wrapped about the animal refuse contained therein.

After completion of this operation, the scoop B is also placed wihin the container A and the container and scoop then rolled into the configuration shown in FIGURE 4. Extension 10a is then wrapped about the rolled container A to prevent the refuse C from inadvertently falling or discharging therefrom. An ordinary rubber band 22 that is included as a part of the package is then slipped over the rolled container A (FIGURE 4) to thereafter maintain the container in this position.

The sealed container A with the refuse C therein may thereafter be carried to a location where it may be discarded, such as a trash barrel, incinerator (not shown) or the like. During the time the container A is in a trash barrel or the like, the refuse C will not attract flies or other insects due to being sealed within the container.

Although a rubber band 22 has been described and illustrated as a convenient means of sealing the container A, it will be realized that other fastening means may be employed for this purpose, such as a string (not shown) attached to extension 10b, pressure sensitive tape, or the like. It will be apparent that due to the stiffness thereof the sheet 16 prevents inadvertent creasing of the container A when the container is in the position shown in FIGURE 1.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

A portable combination flat package for use in removing dog refuse from an area in which it is deposited, including:

(a) a flexible fibrous container in the form of a sack having an open end that is defined by first and second flat side walls, two end walls and a bottom, with said end walls and bottom having centrally disposed fold lines formed therein that extend the length thereof, and said first side wall includes as an integral part thereof an extension that projects beyond said open end, which container is selectively disposable in either a first position in which it is flattened, a second position in which it is expanded to receive dog refuse through said open end when said extension is placed in contact with the surface on which said refuse rests, and a third position in which said container is rolled upon itself with said refuse within the confines thereof, with said extension when said container is in said third position being wrapped thereabout to seal the same;

(b) a rectangular sheet of cardboard of substantial stiffness disposed within said container when in said first position to prevent lateral creasing of said container, which sheet has a plurality of spaced fold lines formed therein that extend longitudinally and transversely therein which aid in shaping said sheet into a scoop when said sheet is removed from said container, and when said sheet is so shaped it defines two parallel longitudinally extending flanges that act as stiffeners in the use of said scoop to pick up refuse and deposit the same together with said sheet in said container when in said second position; and (c) tie means within said container in said first position for holding said container in said third position with said refuse and sheet within the confines thereof with said extension being wrapped around said container to seal the same.

References Cited by the Examiner

UNITED STATES PATENTS

| | | | |
|---|---|---|---|
| 1,106,282 | 8/1914 | Coats | 15—257.1 |
| 1,637,128 | 7/1927 | Palmer. | |
| 1,840,146 | 1/1932 | Wilson. | |
| 2,649,604 | 8/1953 | Hess. | |
| 2,998,907 | 9/1961 | Lange | 229—20 |
| 3,170,183 | 2/1965 | Leatherman | 15—257.1 |
| 3,180,485 | 4/1965 | Nevitt | 206—16 |

LOUIS G. MANCENE, *Primary Examiner.*